US011616773B2

(12) United States Patent
Saldanha et al.

(10) Patent No.: US 11,616,773 B2
(45) **Date of Patent: *Mar. 28, 2023**

(54) SERVER SYSTEM AND METHOD FOR PRODUCING A PROTECTED CONFIGURATION DATA FILE

(71) Applicant: AVEVA Software, LLC, Lake Forest, CA (US)

(72) Inventors: Ryan Benedict Saldanha, Anaheim, CA (US); Vinay T. Kamath, Rancho Santa Margarita, CA (US); Peijen Lin, Irvine, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,995

(22) Filed: May 24, 2021

(65) Prior Publication Data

US 2021/0352063 A1 Nov. 11, 2021

Related U.S. Application Data

(63) Continuation of application No. 16/534,876, filed on Aug. 7, 2019, now Pat. No. 11,050,734, which is a (Continued)

(51) Int. Cl.
*H04L 29/06* (2006.01)
*H04L 9/40* (2022.01)

(52) U.S. Cl.
CPC ................................ *H04L 63/0823* (2013.01)

(58) Field of Classification Search
CPC ............ H04L 63/0823; H04L 63/0428; G06F 21/604; G06F 21/6218; G06F 2221/2113
See application file for complete search history.

(56) References Cited

U.S. PATENT DOCUMENTS 5,918,228 A * 6/1999 Rich .................. G06F 21/6218
6,754,885 B1 * 6/2004 Dardinski ............. G05B 15/02 717/113

(Continued)

OTHER PUBLICATIONS

J. He and M. Wang, "Cryptography and relational database management systems," Proceedings 2001 International Database Engineering and Applications Symposium, Grenoble, 2001, pp. 273-284. (Year: 2001).*

(Continued)

*Primary Examiner* — Ramon A. Mercado
(74) *Attorney, Agent, or Firm* — Greenberg Traurig, LLP

(57) ABSTRACT

Some embodiments of the invention provide systems and methods for securing configuration information for cloud-based services. Some embodiments include a system comprising a data store and data sets including plant process information and configuration information. A memory device stores computer-executable instructions executable by a processor coupled to the cloud service. When executed, the instructions receive configuration information, store it in a data file, apply a generated certificate to the file, and deploy the resulting protected configuration data file to the cloud-based service. In addition, the protected configuration data file is made available by obtaining the file from the cloud-based service.

20 Claims, 8 Drawing Sheets

Related U.S. Application Data continuation-in-part of application No. 16/249,623, filed on Jan. 16, 2019, now Pat. No. 11,032,267, which is a continuation of application No. 14/638,506, filed on Mar. 4, 2015, now Pat. No. 10,191,860.

(60) Provisional application No. 62/715,752, filed on Aug. 7, 2018.

(56) References Cited

U.S. PATENT DOCUMENTS

| | | | | |
|---|---|---|---|---|
| 7,519,776 | B2 * | 4/2009 | Naryzhny | G06F 12/127 711/100 |
| 8,479,008 | B2 * | 7/2013 | Lin | H04L 9/3247 713/178 |
| 9,143,563 | B2 * | 9/2015 | Pingel | H04L 67/12 |
| 2005/0138367 | A1 * | 6/2005 | Paganetti | H04L 63/0823 713/161 |
| 2009/0198648 | A1 * | 8/2009 | Middleton | G06F 16/2428 |
| 2010/0131949 | A1 * | 5/2010 | Ferris | G06F 9/5027 718/1 |
| 2010/0318740 | A1 * | 12/2010 | Guerrasio | G06F 12/126 711/E12.017 |
| 2011/0282866 | A1 * | 11/2011 | Erickson | G06F 16/24568 707/E17.044 |
| 2012/0159178 | A1 * | 6/2012 | Lin | H04L 63/065 713/176 |
| 2013/0124465 | A1 * | 5/2013 | Pingel | H04L 67/12 707/610 |
| 2019/0394190 | A1 * | 12/2019 | Saldanha | H04L 63/0823 |

OTHER PUBLICATIONS

Public-key crptography, Wikipedia, Dec. 2014, https://en/wikipedia.org/wiki/Publickey_cryptography.

J. He and M. Wang, "Cyrptography and relational database management systems," Proceedings 2001 International Database Engineering and Applications Symposium, Grenoble, 2001, pp. 273-284. doi: 10.1109/IDEAS.2001.938095.

* cited by examiner

SERVER SYSTEM AND METHOD FOR PRODUCING A PROTECTED CONFIGURATION DATA FILE

CROSS-REFERENCE TO RELATED APPLICATIONS

This application is a continuation of U.S. application Ser. No. 16/534,876, filed Aug. 7, 2019, entitled "COMPUTER SYSTEM SECURITY SERVER SYSTEM AND METHOD," which is a continuation-in-part of U.S. application Ser. No. 16/249,623, filed Jan. 16, 2019, entitled, "SECURING SENSITIVE HISTORIAN CONFIGURATION INFORMATION," which is a continuation of U.S. application Ser. No. 14/638,506, filed Mar. 4, 2015, entitled "SECURING SENSITIVE HISTORIAN CONFIGURATION INFORMATION", now issued as U.S. Pat. No. 10,191,860, and U.S. application Ser. No. 16/534,876, filed Aug. 7, 2019, entitled "COMPUTER SYSTEM SECURITY SERVER SYSTEM AND METHOD," claims the benefit of and priority to U.S. Provisional Application No. 62/715,752, filed Aug. 7, 2018, entitled, "COMPUTER SYSTEM SECURITY SYSTEM AND METHOD", the entire contents of which are incorporated herein by reference.

BACKGROUND

Despite existing computer security methods, there exists a need to protect the leakage of sensitive information such as storage keys and user passwords from service configuration settings. In a cloud-based application such as Microsoft® Windows® Azure®, the application is configured using configuration files and various configuration items like Azure® storage accounts and keys that are specified in them. When the application reads these properties, the Azure SDK outputs the property value into configuration logs. These logs, if seen by persons authorized to manage the deployment, but not the application itself, could cause data leakage.

SUMMARY

A server system comprising a cloud-based data store comprising a plurality of data sets, at least one of the data sets comprising industrial process-related information, and at least one other of the data sets comprising a service definition file including associated configuration information within a cloud service definition file, where the configuration information is configured for use by a cloud service associated with the data store. Some embodiments include one or more processors coupled to the cloud service via a data communication network. Some embodiments include a memory device coupled to the one or more processors that stores program logic that, when executed by the one or more processors, cause the server system to perform a method for securely providing the configuration information to the cloud service.

In some embodiments, the method comprises receiving a service package including configuration information and application code related to the cloud service from a user terminal authorized according to a service role, and storing the received configuration information in a configuration data file of the service definition file, where the cloud service reads configuration settings from the configuration data file when deployed thereto.

Some embodiments include generating a certificate and applying the certificate to the configuration data file to transform the configuration data file into a protected configuration data file, and deploying the protected configuration data file for querying by a service role of the cloud service for enabling secure storage of the configuration information.

In some embodiments, the configuration information comprises a name of a storage account and/or an access key related to the storage account. In some embodiments, the service role further comprises at least one of a web role providing a dedicated internet information services (IIS) web server used for hosting front-end web applications and a worker role providing applications capable of running asynchronous tasks that are independent of user interaction or input.

In some embodiments, utilizing the cloud service via the service role further comprises storing data related to monitoring process control variables, accessing data related to process control variables, accessing user identification data, and accessing user password data.

In some embodiments, the configuration data file further comprises data related to configuration settings for the cloud service and configuration settings for individual roles, including a number of role instances for the individual roles.

In some further embodiments, the protected configuration data file further comprises data pertaining to the certificate applied to generate the protected configuration data file and data pertaining to a thumbprint of the certificate, and generating a certificate further comprises applying data related to the service role to the configuration data file.

Some embodiments include generating a private key associated with the certificate, and deploying the private key for querying the data sets by the service role.

Some embodiments include a server system comprising a cloud-based data store comprising a plurality of data sets, at least one of the data sets storing time series data representative of historical plant process information and at least one other of the data sets storing configuration information, where the configuration information is configured for use by a cloud service associated with the data store. Further, some embodiments include one or more processors coupled to the cloud service via a data communication network. Some embodiments include a memory device coupled to the one or more processors that stores computer-executable instructions that, when executed by the one or more processors, cause the server system to perform a method for securely obtaining the configuration information from the cloud service, wherein the method comprises. Some embodiments include querying a protected configuration data file using the service role, where the configuration data file received by the cloud-based data store as a service package including application code. Some embodiments include using a generated certificate associated with the service role and associated with the protected configuration data file to transform the protected configuration data file into an accessible protected configuration data file. Some embodiments include generating a secure entry for a secure output file log based at least in part upon the service role performing the query and the certificate.

In some embodiments, the configuration information comprises at least one of a name of a storage account and an access key related to the storage account. In some embodiments, the service role further comprises at least one of a web role providing a dedicated internet information services (IIS) web server used for hosting front-end web applications and a worker role providing applications capable of running asynchronous tasks that are independent of user interaction or input.

Some embodiments include utilizing the cloud service via the service role further comprises storing data related to monitoring process control variables, and/or accessing data related to process control variables, and/or accessing user identification data, and/or accessing user password data.

In some embodiments, the configuration data file further comprises data related to configuration settings for the cloud service and configuration settings for individual roles, including a number of role instances for the individual roles.

In some further embodiments, the method for securely obtaining the configuration information from the cloud service further comprises providing a private key associated with the certificate, generating a configuration data file by applying the private key to the protected configuration data file, and generating an entry for an output file log based at least in part upon the service role performing the query and upon the private key.

Some embodiments include a computer-implemented method for securely providing and obtaining configuration information using a cloud service, where the method comprises receiving, from a user terminal authorized according to a service role, configuration information related to the cloud service, and where the configuration information forms part of a service package including application code.

Further embodiments include storing the received configuration information in a configuration data file, where the cloud service reads configuration settings from the configuration data file when deployed thereto, and generating a certificate and applying the certificate to the configuration data file to transform the configuration data file into a protected configuration data file. Further employments include deploying the protected configuration data file for querying by a service role of the cloud service for enabling secure storage of the configuration information. Other embodiments include querying the protected configuration data file using the service role, and using a generated certificate to generate an accessible protected configuration file, where the generated certificate is associated with the service role and the protected configuration data file. Some further embodiments include generating an entry comprising a secure entry for a secure output file log based at least in part upon the service role performing the query.

In some embodiments, the configuration information comprises at least one of a name of a storage account and an access key related to the storage account. In some further embodiments, the service role further comprises a web role providing a dedicated internet information services (IIS) web server used for hosting front-end web applications and/or a worker role providing applications capable of running asynchronous tasks that are independent of user interaction or input.

Some embodiments include utilizing the cloud service via the service role that further comprises storing data related to monitoring process control variables, and/or accessing data related to process control variables, and/or accessing user identification data, and accessing user password data.

In some embodiments, the configuration data file further comprises data related to configuration settings for the cloud service and configuration settings for individual roles, including a number of role instances for the individual roles.

Other embodiments include generating a certificate and applying the certificate to the configuration data file that further comprises generating a private key associated with the certificate, and using a generated certificate further comprises using a certificate associated with a private key, and where the generated certificate is used to generate a configuration data file.

Some embodiments include generating an entry that comprises an entry for an output file log based at least in part upon the service role performing the query and the private key. In some further embodiments, the service role deploying the protected configuration data file is distinct from the service role querying the protected configuration data file.

DETAILED DESCRIPTION

Figure 1A:
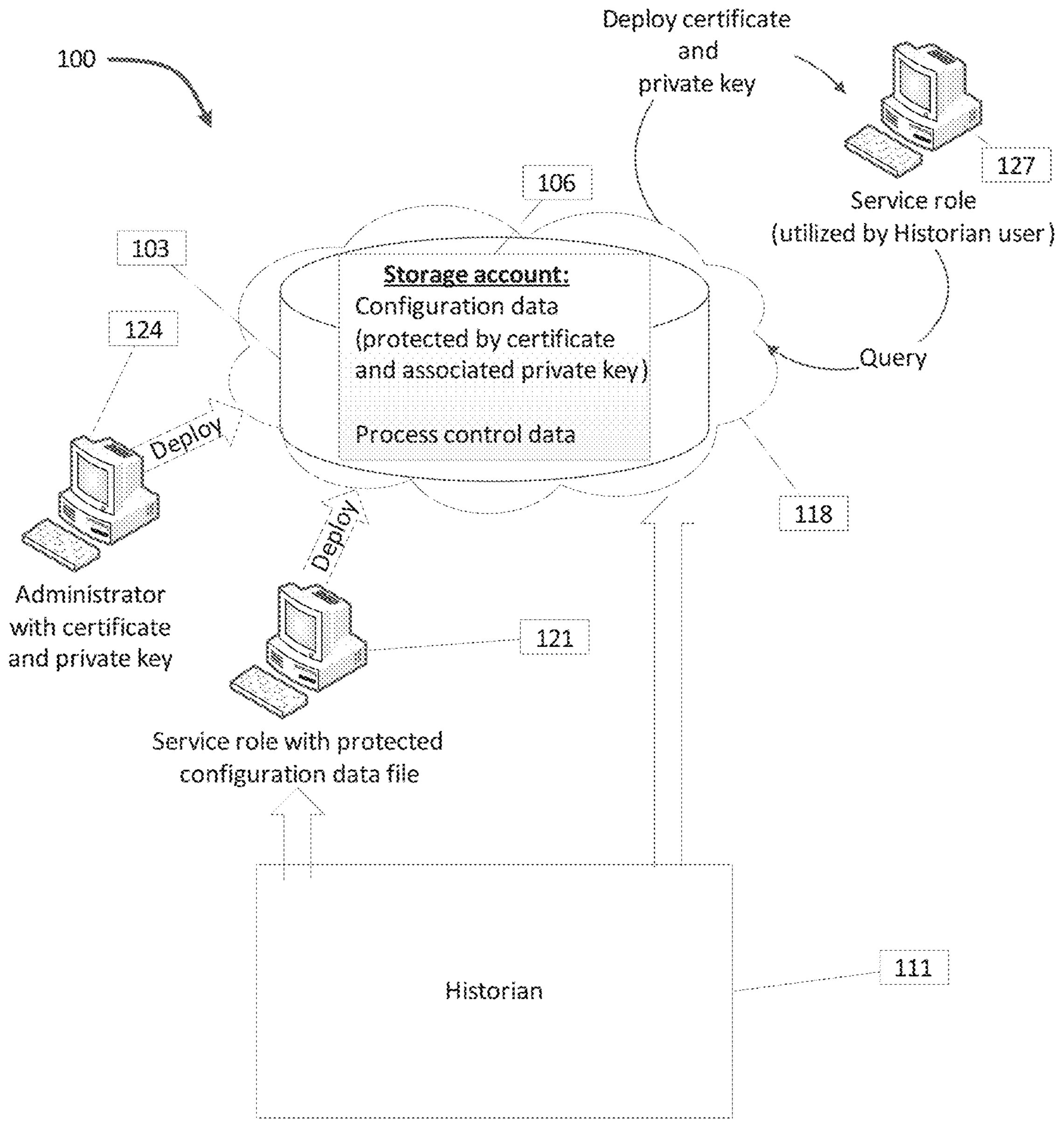
FIGS. 1A and 1B depict a computer system for securely providing and obtaining configuration data according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings. Further, “connected” and “coupled” are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, a cloud service role can comprise application files and a configuration or configuration file. A cloud service can have two types of role including a web role which provides a dedicated Internet Information Services (IIS) web-server used for hosting front-end web applications, and a worker role including applications hosted within worker roles that can run asynchronous, long-running or perpetual tasks independent of user interaction or input.

For the purposes of this disclosure, the term "server" should be understood to refer to a service point which provides processing, database, and communication facilities. A computing device may be capable of sending or receiving signals, such as via a wired or wireless network, or may be capable of processing or storing signals, such as in memory as physical memory states, and may, therefore, operate as a server. Thus, devices capable of operating as a server can include, as examples, dedicated rack-mounted servers, desktop computers, laptop computers, set top boxes, integrated devices combining various features, such as two or more features of the foregoing devices, or the like. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as a Microsoft® Windows® Server, Mac OS X, Unix, Linux, and/or any other conventional operating system. Microsoft® and Windows® are registered trademarks of Microsoft Corporation, Redmond, Wash.

For the purposes of this disclosure, a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, 4th, or 5th generation (2G, 3G, 4G, or 5G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth®, 802.11b/g/n, or the like. A wireless network may include virtually any type of wireless communication mechanism by which signals may be communicated between devices, such as a client device or a computing device, between or within a network, or the like.

As used herein, a service definition file can comprise a service definition file (.csdef) that defines the service model, including the number of roles.

As used herein, a service configuration file can be a cloud service configuration file (.cscfg) that provides configuration settings for the cloud service and individual roles, including the number of role instances.

As used herein, a service package can be a service package (.cspkg) that contains the application code and the service definition file.

As used herein, certificate based encryption (CBE) can be a public-key encryption scheme using PKCS7 (http://tools.ietf.org/html/rfc2315). In this instance, the messages are encrypted using 3DES. In this instance, no signing is done since the requirement is to protect the message from prying eyes and not non-repudiation.

Referring now to the figures, aspects of this invention relate to providing additional security to cloud-based data, and more specifically, to securely providing and obtaining configuration data to prevent data leakage when a cloud-based application reads properties in a file containing configuration data. For example, a computer system for securely providing and obtaining configuration information such as configuration data embodying aspects of the invention, generally referenced at 100 in FIG. 1A, can comprise configuration information stored on a database and a cloud service connected to the database via a data communication network. In an embodiment, authorized users can access configuration information via the cloud service.

Additionally, some embodiments of the invention secure sensitive configuration information related to cloud-based resources. Securing this sensitive configuration information protects against compromising the data shared by the cloud service in the event that an unauthorized user obtains the physical hard drive on which the configuration information is stored, or gains access to the local network that is communicatively connected to the configuration information provided by the cloud service.

In FIG. 1A, a computer system 100 includes a cloud-based data store 103 storing a plurality of data sets. Although referred to as "process control data" in an embodiment, the plurality of data sets can be stored through the use of a storage account 106, and comprise at least configuration data and process control data. In some embodiments, the data sets stored through the use of a storage account 106 can include at least time series data and configuration data, and are derived in part from a data acquisition process generally depicted in by FIG. 1B. For example, in some embodiments, the storage account 106 can comprise a series of hard disks. In an embodiment, storage account 106 can be associated with a process historian 111 configured for storing large volume plant data and providing reporting, analysis, and visualization.

Figure 1B:
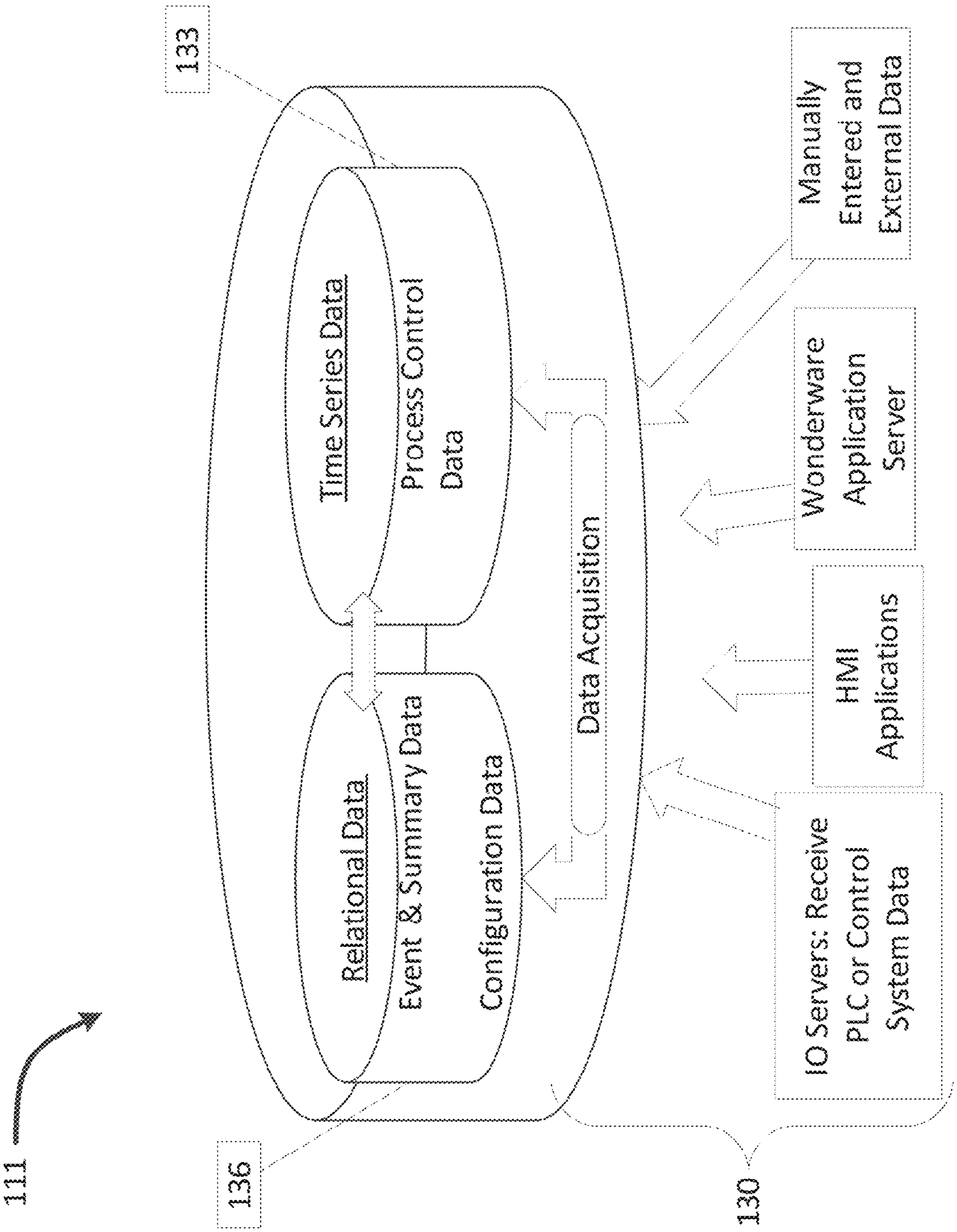

Referring to FIG. 1B, in some embodiments, the historian 111 includes a time series database 133 and a relational database 136 according to an embodiment of the invention. In an embodiment, the time series database 133 and the relational database 136 can each derive data from various sources during data acquisition 130, including at least one of: IO Servers, HMI applications, an application server, and manually entered and external data. In some embodiments, time series data is in part provided by process control data stored in the time series database 133. In some embodiments, time series data can describe data that is representative of historical plant process information such as, for example, a continuum of process flow values measured over a period of time. In some embodiments, configuration data is in part provided by the relational database 136. In some embodiments, the configuration data can describe configuration settings for a cloud service 118 and individual roles utilized by the cloud service 118, as described above. In some embodiments, the configuration data provided by the relational database 136 is used by a cloud service 118 associated with the cloud-based data store 103. In some embodiments, a cloud service role (or "service role") can comprise an application capable of running on the cloud-based computer system provider. In an embodiment, a cloud service role further includes a configuration. In some embodiments, the cloud service role can have two types: a web role and a worker role.

In some embodiments, the web role is, for example, a service role capable of providing a dedicated Internet Information Services (IIS) web-server used for hosting front-end web applications. In some further embodiments, the worker role is understood to be a service role capable of hosting applications that can run asynchronous, long-running or perpetual tasks independent of user interaction or input.

Referring again to FIG. 1A, in some embodiments, the system 100 further comprises one or one or more processors coupled to the cloud service 118 via a data communication network. In an embodiment, the processors can be included in terminals such as a service role terminal 121, an administrator terminal 124, and a query terminal 127, which will be described in more detail herein. Further, in some embodiments, memory devices can be coupled to the one or more processors, the memory devices storing computer-executable instructions that, when executed by the one or more processors, cause the computer system to perform a method for securely providing the configuration data to the cloud service 118, which will also be described in more detail herein.

In some embodiments, the worker and web roles as described above require access to one or more storage accounts 106 administered by the cloud-based computer system provider that is managing the cloud service 118 in order to either access or store data. In an embodiment, the configuration data can provide the required access through the use of parameters that comprise a name of a storage account 106, and an access key (see FIG. 2) related to the storage account 106. In some embodiments, the access key according to embodiments of the invention can allow a user to access the process data in the storage account 106. In addition, it is generally understood that the roles require access to other sensitive information such as user identification data and passwords in order to access other resources provided by the cloud-based computer system provider managing the cloud service 118. A non-limiting example of storing the name and access key related to a storage account 106 in a cloud service configuration file is displayed in Table 1. The cloud service configuration file (designated by .cscfg) in this example provides configuration settings for the cloud service and individual roles, including the number of role instances.

TABLE 1

Example service definition file, account name and account key

| Service definition file (.cscfg) | Account name and access key portion of .cscfg file |
|---|---|
| xmlns:xsd=http://www.w3.org/2001/XMLSchema xmlns:xsi="http://www.w3.org/2001/XMLSchema-instance" serviceName="AzureHistorian" osFamily="3" osVersion="*" schemaVersion="2013-10.2.2" xmlns="http://schemas.microsoft.com/ServiceHosting/2008/10/ServiceConfiguration"> <Role name="ClientAccessPoint"> <ConfigurationSettings> <Setting name="Diagnostics.ConnectionString" value="DefaultEndpointsProtocol=https;AccountName = ryans;AccountKey=MWRyH4SPuceMKo/U834UVjnqmSygignuAc/+Ej+pNapX0R0aPcROw4Hf8p57E+Quf10nikaKSB2×3OchsXd74Q==" /> <Setting name="Historian.ConfigurationStore" value="DefaultEndpointsProtocol=https;AccountName=ryans;AccountKey=MWRyH4SPuceMKo/U834UVjnqmSygignuAc/+Ej+pNapX0R0aPcROw4Hf8p57E+Quf10nikaKSB2×3OchsXd74Q==" />. | Account name: "ryans" Account key: "MWRyH4SPuceMKo/U834UVjnqmSygignuAc/+Ej+pNapX0R0aPcROw4Hf8pS7E+Quf10nikaKSB2×3OchsXd74Q==" |

Figure 2:
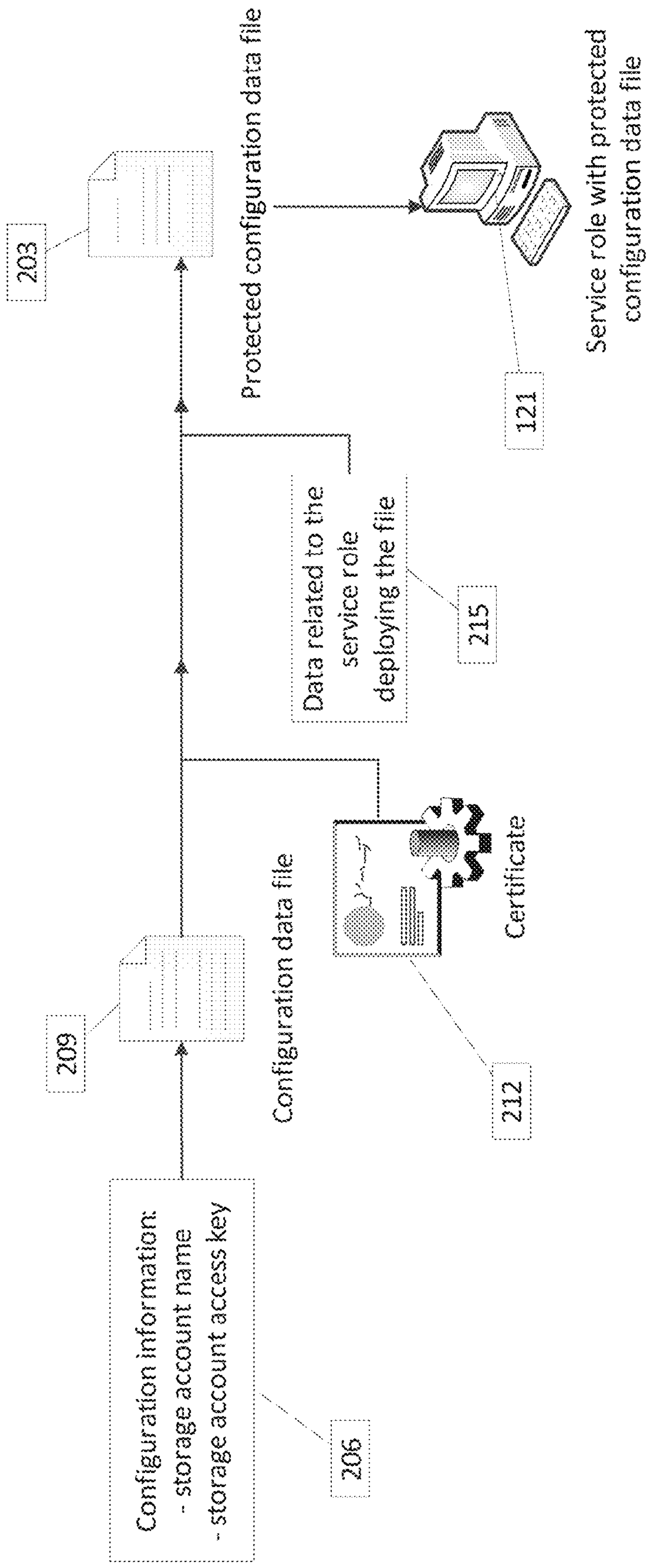
FIG. 2 depicts the generation of a protected configuration data file to be deployed by a service role according to some embodiments of the invention.

FIG. 2 depicts the generation of a protected configuration data file 203 to be deployed by a service role according to one embodiment of the invention. In an embodiment, the protected configuration data file 203 can be generated using configuration information 206, also known as configuration data stored in a relational database 115. In an embodiment, the configuration information 206 is passed by the service role terminal 121 to the storage account 106 that is stored in the cloud-based data store 103. Advantageously, some embodiments invention are configured to protect configuration details that are entered as configuration data provided by the relational database 115. In some embodiments, the configuration data, also called configuration information 206, can loaded into a data file as plain text, and aspects of the invention can prevent the data from being seen by unauthorized users while the data sets storing time series data and configuration information 206 are backed up using the cloud-based data store 103 and the cloud service 118.

With further reference to FIG. 2, the generation of a protected configuration data file 203 can comprise data that is to be entered into a configuration data file 209. In some embodiments, this data comprises configuration information 206, also known as configuration data. In some embodiments, the configuration information 206 can comprise at least a storage account name and a storage account access key. In an embodiment, a certificate 212, generated using, for example, a public-key encryption scheme as described above, can be applied to the configuration data file 209. In an embodiment, the service role data 215 related to the service role deploying the file can be applied to the configuration data file 209, resulting in the generation of a protected configuration data file 203. Advantageously, by providing the capability of deploying a protected configuration data file 203 through the application of public-key encryption, unauthorized users can be prevented from unnecessarily having access to private keys, and the likelihood of compromising configuration information 206 is reduced.

Figure 3:
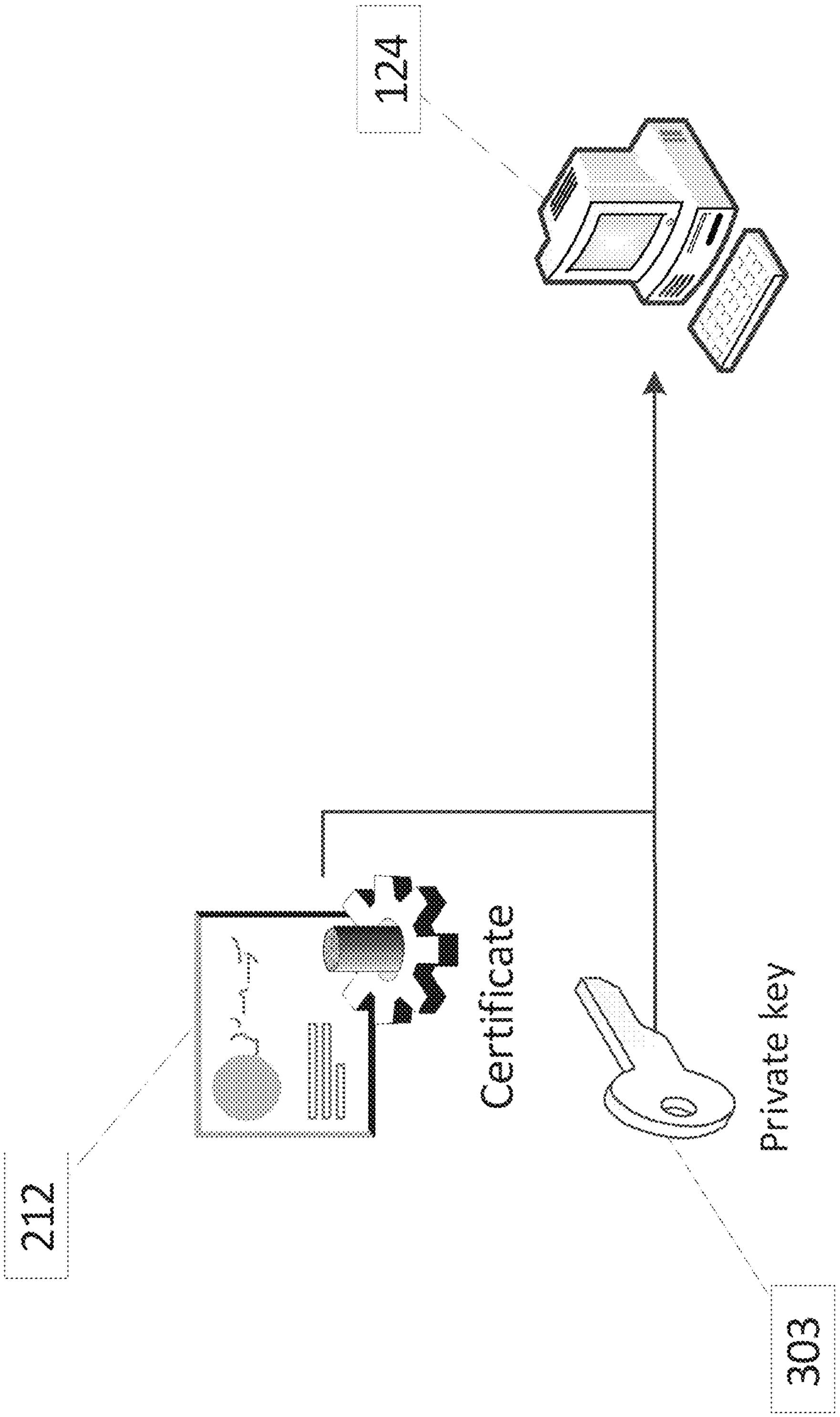
FIG. 3 depicts the deployment of a generated certificate and private key according to some embodiments of the invention.

FIG. 3 depicts the deployment of a generated certificate 212 and private key 303 according to one embodiment of the invention. In some embodiments, a certificate 212 and a private key 303 associated with the certificate 212 are combined at a service role with appropriate authorization, such as a service role accessed at an administrator terminal 124. In this non-limiting example embodiment, the service role can be configured to deploy the private key 303 and the certificate 212 to the cloud service 118. In a further embodiment, the cloud service 118 can host the service role. In yet another embodiment, the service role can use a controlled and audited mechanism to deploy the private key 303 and the certificate 212. In an embodiment, the controlled and audited mechanism can be in part provided by the cloud-based computer system provider, and in part provided by a department tasked with managing the installation, deployment, and/or configuration of a cloud-based application to a network.

In a further embodiment, the private key 303 and certificate 212 can be deployed to the cloud service 118 that will host the service role. In yet another embodiment, the private key 303 and certificate 212 can be deployed via a coding mechanism that is distinct from the coding mechanism that utilizes the private key 303 and certificate 212. Advantageously, some embodiments providing distinct coding mechanisms in the manner described lower the risk of unnecessarily exposing the certificate 212 and private key 303 to administrators and developers.

Additionally, in some embodiments, the private key 303 and certificate 212 can be uploaded in an encrypted archive file format by accessing the cloud-based computer system provider. In some embodiment, the private key 303 and certificate 212 are uploaded using PKCS12 (PFX) file format. In some embodiments, the uploaded files are password protected, with the password being specified during the upload process. Using the manner previously described, the controlled and audited mechanism results in an upload of the private key 303 and the certificate 212 to the cloud-based data store 103. In an embodiment, the department tasked with managing the installation, deployment, and/or configuration of a cloud-based application to a network restricts access to the private key 303 and certificate 212 to authorized personnel. In a further embodiment, the department's internal processes govern access to the private key 303.

In an embodiment, the protected configuration data file 203 can comprise the encrypted configuration values as well as a thumbprint of the certificate 212 as specified in a service configuration file. A non-limiting example of the result of such a process is displayed in Appendix C.

TABLE 3

A non-limiting example embodiment of encrypted configuration values and thumbprint of the certificate specified in the service configuration Encrypted configuration values and thumbprint of the certificate specified in the service configuration

```
<ServiceConfiguration xmlns:xsi="http://www.w3.org/2001/XMLSchema-instance"
xmlns:xsd="http://www.w3.org/2001/XMLSchema" serviceName="AzureHistorian"
osFamily="3" osVersion="*" schemaVersion="2014-01.2.3"
xmlns="http://schemas.microsoft.com/ServiceHosting/2008/10/ServiceConfiguration">
<Role name="ClientAccessPoint">
<ConfigurationSettings>
<Setting name="Diagnostics.ConnectionString"
value="__CBE_V1__MIIByQYJKoZIhvcNAQcDoIIBujCCAbYCAQAxgfEwge4CAQAwVz
BJMRMwEQYKCZImiZPyLGQBGRYDY29tMRQwEgYKCZImiZPyLGQBGRYEY29ycD
EcMBoGA1UEAxMTSW52ZW5zeXNJc3N1aW5nQ0EwMgIKHOgklQAAAAiagzANBgkqh
kiG9w0BAQEFAASBgBZoNKkUPtbBkM68w5xZQ2dw9LBBQdhhkzsce/7ubS7RoGoG2Qk
jtZ2XEi9xJOO+dJGFxhgFw3Cr/62DI6ksIH94MsNZ2rQcjm2FbUxfYfy3h2uiOyE3CpXVae
MjAROHoFaJnxFRDDJSa7oi4pa12sa50o+WXb7P2IIN+Vp82TXMIG8BgkqhkiG9w0BBwE
wFAYIKoZIhvcNAwcECH1/qcK6arZcgIGYAToxlvqxiHaWOVrEWG5TeiMb1pLmCgXut0
qHH7sofy49zfEnPvCRbyctyYMI2fgfJPILtJAsZ2Z/iUcXVZTZudMQSGHG4ZhhFeIvWvNC
5iB78J6GHAuCvgBT5VonABK7Qvl2vMmLnLhuVGxi2O2LXLzm1CpO3w8NZQMFDGgs
pjTByrffGV+5ISn2vzLHtYLQp3q5zBiTp2M=" />
<Setting name="Historian.ConfigurationStore"
value="__CBE_V1__MIIByQYJKoZIhvcNAQcDoIIBujCCAbYCAQAxgfEwge4CAQAwVz
```

TABLE 3-continued

A non-limiting example embodiment of encrypted configuration values and thumbprint of the certificate specified in the service configuration

| Encrypted configuration values and thumbprint of the certificate specified in the service configuration |
|---|

```
BJMRMwEQYKCZImiZPyLGQBGRYDY29tMRQwEgYKCZImiZPyLGQBGRYEY29ycD
EcMBoGA1UEAxMTSW52ZW5zeXNJc3N1aW5nQ0EwMgIKHOgklQAAAAiagzANBgkqh
kiG9w0BAQEFAASBgBZoNKkUPtbBkM68w5xZQ2dw9LBBQdhhkzsce/7ubS7RoGoG2Qk
jtZ2XEi9xJOO+dJGFxhgFw3Cr/62DI6ksIH94MsNZ2rQcjm2FbUxfYfy3h2uiOyE3CpXVae
MjAROHoFaJnxFRDDJSa7oi4pa12sa50o+WXb7P2IIN+Vp82TXMIG8BgkqhkiG9w0BBwE
wFAYIKoZIhvcNAwcECH1/qcK6arZcgIGYAToxlvqxiHaWOVrEWG5TeiMb1pLmCgXut0
qHH7sofy49zfEnPvCRbyctyYMI2fgfJPILtJAsZ2Z/iUcXVZTZudMQSGHG4ZhhFeIvWvNC
5iB78J6GHAuCvgBT5VonABK7Qvl2vMmLnLhuVGxi2O2LXLzm1CpO3w8NZQMFDGgs
pjTByrffGV+5ISn2vzLHtYLQp3q5zBiTp2M=" />
<Setting name="Historian.NamedPipes.UserName"
value="__CBE_V1__MIIBPwYJKoZIhvcNAQcDoIIBMDCCASwCAQAxgfEwge4CAQAw
VzBJMRMwEQYKCZImiZPyLGQBGRYDY29tMRQwEgYKCZImiZPyLGQBGRYEY29yc
DEcMBoGA1UEAxMTSW52ZW5zeXNJc3N1aW5nQ0EwMgIKHOgklQAAAAiagzANBgk
qhkiG9w0BAQEFAASBgFfMyC6+6iggWEeM6TKUzXeGArKnfM+adZ/LNizmxzbdjlVkZV
P2GKAN5s+p0x8cq6+Af8cnIo5wjVgIOpaRvkO6Sdv0miUbgcfI9Iq4CmkVGAmKnFnGg7qe
3co8jbTbS3J3P9hp8c1etOR9fnx2FHcAQ/YDenQMlz+tPa8scQDvMDMGCSqGSIb3DQEH
ATAUBggqhkiG9w0DBwQItyB78bM296eAEJE5DRS2eeBdPbqKKaSDY7M=" />
<Setting name="Historian.NamedPipes.Password"
value="__CBE_V1__MIIBPwYJKoZIhvcNAQcDoIIBMDCCASwCAQAxgfEwge4CAQAw
VzBJMRMwEQYKCZImiZPyLGQBGRYDY29tMRQwEgYKCZImiZPyLGQBGRYEY29yc
DEcMBoGA1UEAxMTSW52ZW5zeXNJc3N1aW5nQ0EwMgIKHOgklQAAAAiagzANBgk
qhkiG9w0BAQEFAASBgCuyMQjjGeAH5ou/p2OIpiAFNfs14ajfiEopqMs1ou+vxRCC/gx8T
+w5g5wL/z27HKQ6KU7Y/NX9brOV/gQhGlkQT3Ky8pMoAPZkVZAz8jW9RPT/MAyUSG
gg9US7iXvLRzMbeYiH7gdO7+5X5ISohj2PZ+IZrGp5KrQix93L0IWcMDMGCSqGSIb3DQ
EHATAUBggqhkiG9w0DBwQIJ7vrnjqyVD6AEIo5kSMfIEtoTGizzP1Fyv0=" />
<Setting name="CBE.Thumbprint"
value="6E97496A220DC18DD413176E9909AF1F2319CC1A" /> </ConfigurationSettings>
<Instances count="1" /> <Certificates> <Certificate name="SSL"
thumbprint="6E97496A220DC18DD413176E9909AF1F2319CC1A"
thumbprintAlgorithm="sha1" />
<Certificate name="CBE"
thumbprint="6E97496A220DC18DD413176E9909AF1F2319CC1A"
thumbprintAlgorithm="sha1" />
<Certificate name="Microsoft.WindowsAzure.Plugins.RemoteAccess.PasswordEncryption"
thumbprint="6E97496A220DC18DD413176E9909AF1F2319CC1A"
thumbprintAlgorithm="sha1" />
</Certificates>
</Role>
```

In an embodiment, the thumbprint can uniquely identify the certificate 212. In a further embodiment, the process resulting in the encoded data including the encrypted values being uploaded to the cloud based service 118 as a protected configuration data file 203 can involve the use of a tool that only needs a certificate 212 for the encoding and uploading process, and not a private key 303 associated with the certificate 212. Advantageously, in some embodiments, the tool provides for the deployment of cloud-based resources to the network without the need for an associated private key 303, thereby allowing the private key 303 to be tightly controlled. In an embodiment, the user points to the thumbprint of the certificate 212 and clicks on an "encrypt" button to begin an encryption process. In some embodiments, the thumbprint of the certificate 212 is provided by an out-of-band communication, as is understood by one having ordinary skill in the art. Advantageously, some embodiments of the tool are specifically designed for users who are unfamiliar with encryption processes.

In some embodiments, the protected configuration data file 203 can additionally contain an identifier pertaining to the type of certificate 212 used to encrypt the file. In this manner, an unauthorized user who has accessed the configuration data, such as by removing the physical drive for example, is not able to access the configuration information 206 encrypted on the drive. However, an authorized user can view the decrypted data, and thus is able to view the identifier pertaining to the type of certificate 212 used to encrypt the file.

Figure 4:
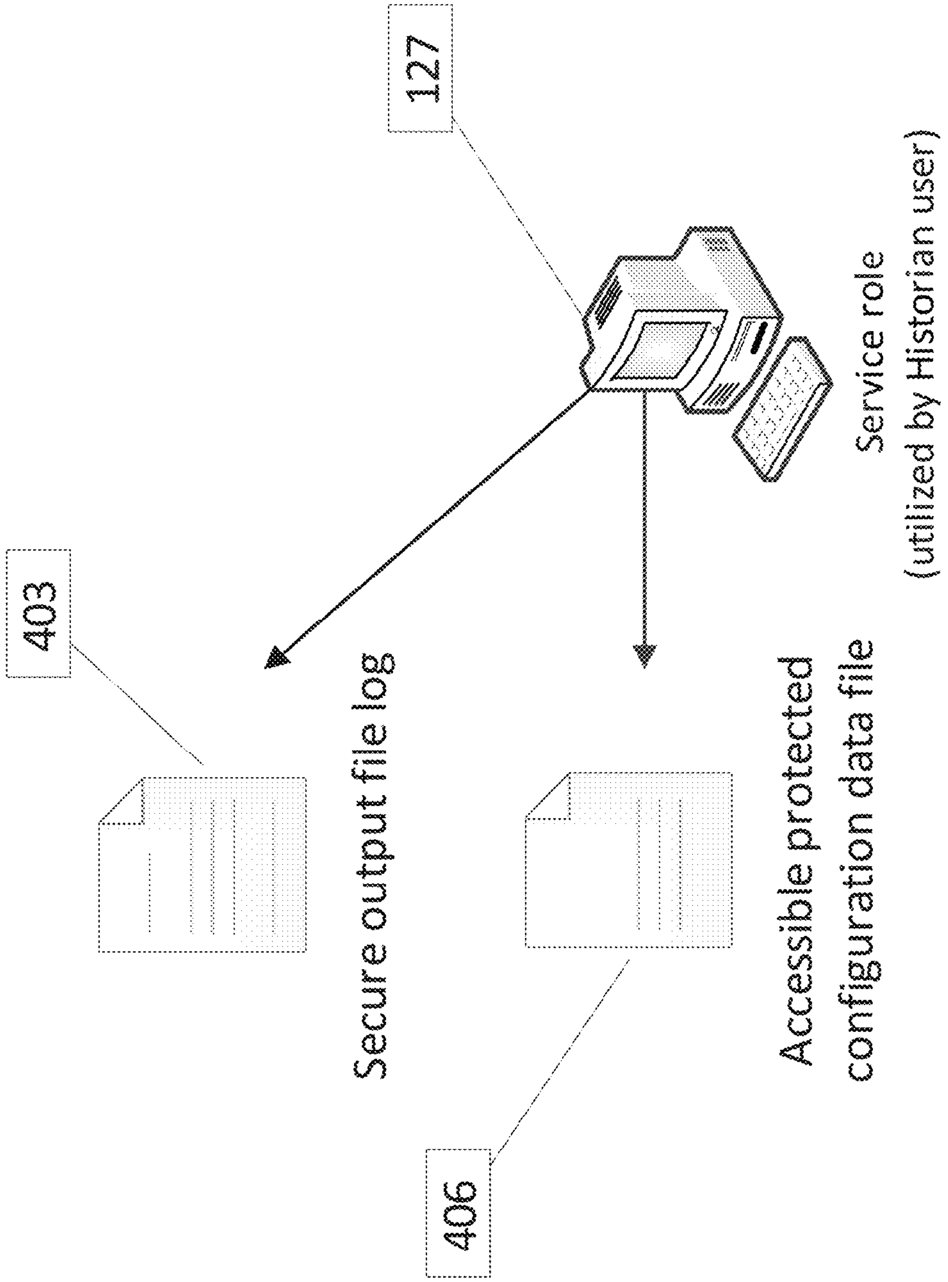
FIG. 4 depicts the outputs resulting from reading configuration information properties in accordance with some embodiments of the invention.

FIG. 4 depicts exemplary outputs resulting from reading configuration information 206 properties in accordance with some embodiments of the invention. In this instance, a service role such as the service role accessed by the query terminal 127 can access configuration information 206 contained in a configuration data file 209 stored in a storage account 106. In some embodiments, software components administered by the cloud service 118 output details related to the service role query into output file logs. In some embodiments, the output file logs comprise, for example, secure output file logs 403 that result from querying the protected configuration data file 203 that is generated by applying the certificate 212 to the configuration data file 209 as previously described with reference to FIG. 2.

In some further embodiments, the output file log results from the additional application of service role data 215 related to the service role deploying the file as previously described. A non-limiting example of such a secure output file log 403 is displayed in Table 2. It is to be understood that in some embodiments, the secure output file log 403 is presented in an encrypted form to the user in an embodiment, and is presented in a decrypted form if the user demonstrates appropriate authorization. In some embodiments, appropriate authorization is demonstrated through, for example, the application by the user of a private key 303, as will be further described below.

TABLE 2

| Log file example |
| --- |
| Log file |
| “00001587852.66583252 [3676] Getting "Diagnostics.ConnectionString" from<br>ServiceRuntime: PASS<br>(DefaultEndpointsProtocol=https;AccountName=ryans;AccountKey=MWRyH4SPuceMKo/U<br>834UVjnqmSygignuAc/+Ej+pNapX0R0aPcROw4Hf8pS7E+Quf10nikaKSB2x3OchsXd74Q=<br>=).” |

In some embodiments, a user of historization software can utilize the service role accessed, for example, by a query terminal 127. In some embodiments, the historization software provides the capability of combining a proprietary high-speed data acquisition and storage system with a Microsoft SQL server backend for enhanced data retrieval capabilities. In some embodiments, details that are output to the secure output file log 403 as a result of the service role querying configuration information 206 contained in the configuration data file 209 are protected by, for example, performing encoding operations on the data. In a further embodiment, the details are protected by encoding the data using certificate based encryption (CBE) on the data as defined above. Certificate based encryption (CBE) is generally understood to refer to a public-key encryption scheme using PKCS7 (http://tools.ietf.org/html/rfc2315). In some embodiments, the messages are encrypted using 3DES. No signing is done since the requirement is to protect the message from prying eyes and not non-repudiation.

In some embodiments, protecting the details in this manner provides for various levels of security over the configuration information 206. Advantageously, various levels of security allow for users that are authorized to manage less-secure tasks, such as the operations department tasked to manage the deployment of a cloud-based application to a network, to be prevented from accessing configuration information 206 encrypted in the secure output file log 303 as well as configuration information 206 in the accessible protected configuration data file 306. It is advantageous to prevent such users to access such configuration information 206 to prevent the users tasked with managing deployment of the application from managing the application itself, which increases the possibility of unnecessarily compromising the configuration information 206.

In some embodiments, as a result of the encoding and uploading process, the details that are output into a log file are output in an encoded form when a service role is deployed and reads the configuration data. In some embodiments, an authorized service role has access to, for example, a private key 303 associated with the certificate 212, which allows the authorized service role to retrieve and decode the encoded output. In some embodiments, the private key 303 is uploaded to the cloud service 118 by an authorized user with access to the private key 303, such as an administrator. In some embodiments, the private key 303 need only be uploaded a single time to provide access to the cloud service 118 via a service role associated with the private key 303. In some embodiments, access to by the application (or “service role”) to the private key 303 is automatic once the role is deployed.

Advantageously, in some embodiments, the above-described process allows users that are not authorized to access the private key 303, such as users tasked with managing the deployment of a service role to be authorized to deploy service roles, because access to the private key 303 is not necessary in order to deploy roles. Further, even in the event that the details that are output into the log file are compromised as described above, without access to the associated private key 303, a user is unable to decode the details, thus protecting the configuration information 206 from being compromised. A non-limiting example of an encrypted log entry in a secure output file log 403 is displayed in Table 4.

| Log entry with encrypted values is shown in Table 4: |
| --- |
| Log entry |
| 00001587 852.66583252 [3676] Getting "Diagnostics.ConnectionString" from<br>ServiceRuntime: PASS<br>(__CBE_V1__MIIByQYJKoZIhvcNAQcDoIIBujCCAbYCAQAxgfEwge4CAQAwVzBJMR<br>MwEQYKCZImiZPyLGQBGRYDY29tMRQwEgYKCZImiZPyLGQBGRYEY29ycDEcMB<br>oGA1UEAxMTSW52ZW5zeXNJc3N1aW5nQ0EwMgIKHOgklQAAAAiagzANBgkqhkiG9<br>w0BAQEFAASBgBZoNKkUPtbBkM68w5xZQ2dw9LBBQdhhkzsce/7ubS7RoGoG2QkjtZ2<br>XEi9xJOO+dJGFxhgFw3Cr/62DI6ksIH94MsNZ2rQcjm2FbUxfYf8y3h2uiOyE3CpXVaeMj<br>AROHoFaJnxFRDDJSa7oi4pa12sa50o+WXb7P2IIN+Vp82TXMIG8BgkqhkiG9w0BBwEwF<br>AYIKoZIhvcNAwcECH1/qcK6arZcgIGYAToxlvqxiHaWOVrEWG5TeiMb1pLmCgXut0qH<br>H7sofy49zfEnPvCRbyctyYMI2fgfJPILtJAsZ2Z/iUcXVZTZudMQSGHG4ZhhFeIvWvNC5iB<br>78J6GHAuCvgBT5VonABK7Qvl2vMmLnLhuVGxi2O2LXLzm1CpO3w8NZQMFDGgspjT<br>ByrffGV+5ISn2vzLHtYLQp3q5zBiTp2M=).<br>00001588 852.66668701 [3676] Getting "CBE.Thumbprint" from ServiceRuntime: PASS<br>(6E97496A220DC18DD413176E9909AF1F2319CC1A). |

Figure 5:
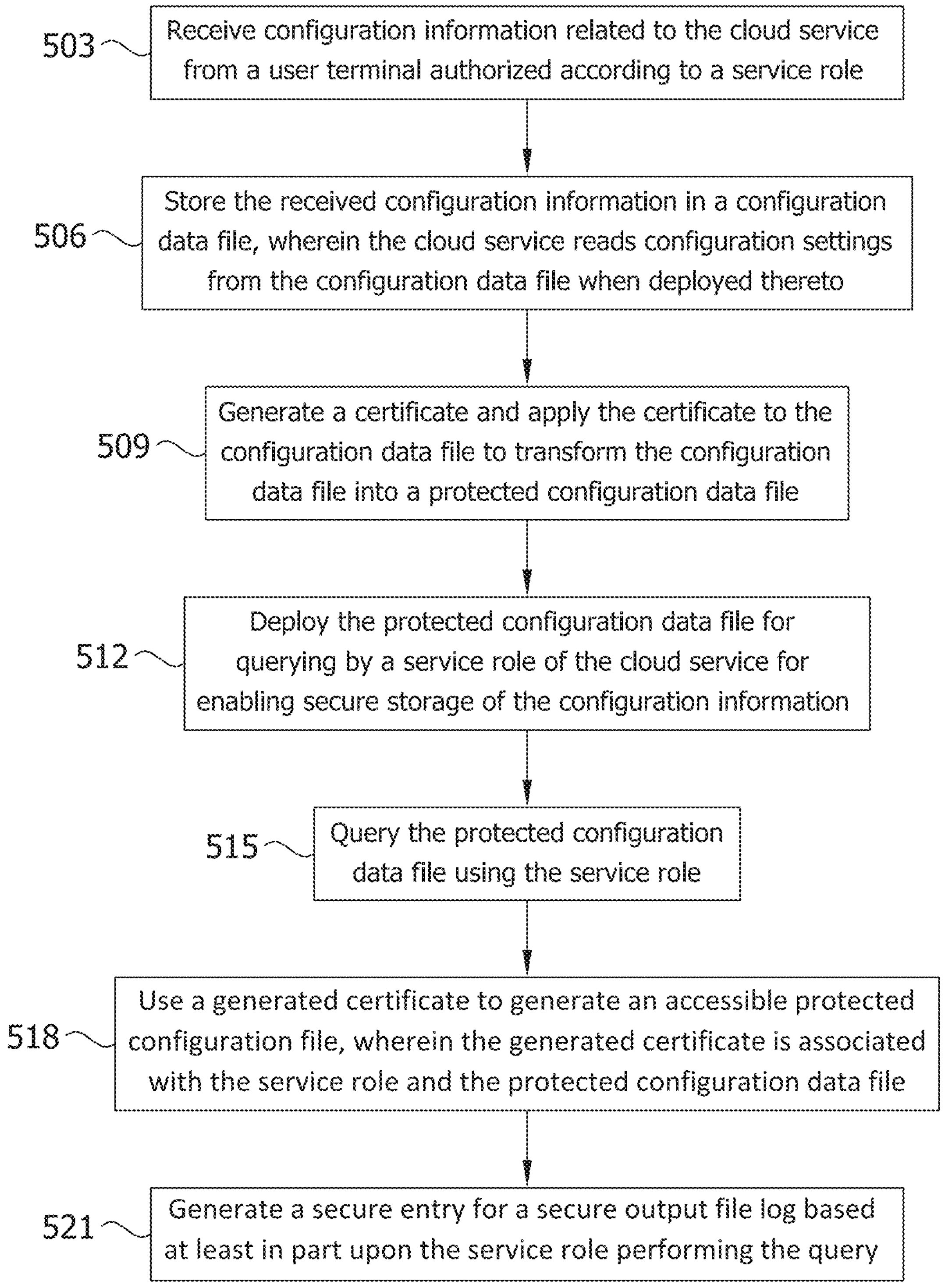
FIG. 5 is an exemplary flow diagram illustrating a method for securely providing and obtaining configuration information using a cloud service in accordance with some embodiments of the invention.

FIG. 5 depicts a method for securely providing and obtaining configuration information 206 using a cloud service in accordance with one embodiment of the present invention. The process begins at 503, where a user terminal such as a service role terminal 121 that is authorized according to a service role receives configuration information 206 related to the cloud service 118. In some embodiments, at 506, the received configuration information 206 is stored in a configuration data file 209, and the cloud service 118 reads configuration settings from the configuration data file 209 when the cloud service 118 is deployed thereto, such as through the operation of a query by a service role terminal 127, in one non-limiting example. In some embodiments, the configuration data file 209 further comprises data related to configuration settings for the cloud service 118 and configuration settings for the individual roles, including the number of role instances for the individual roles.

The process continues at 509, where, in some embodiments, a certificate 212 is generated and applied to the configuration data file 209 to generate a protected configuration data file 203. In an embodiment, service role data 215 related to the service role deploying the file is applied to the configuration data file 209 along with the certificate 212. In another embodiment, a private key 303 associated with the certificate 212 is additionally generated. In some embodiments, at 512, the protected configuration data file 203 is deployed for querying by a service role of the cloud service 118 for enabling secure storage of the configuration information 206.

The process depicted in FIG. 5 continues at 515, where the protected configuration data file 203 is queried using the service role. In some embodiments, at 518, the generated certificate 212 is used to generate an accessible protected configuration file 306, wherein the generated certificate 212 is associated with the service role and the protected configuration data file 203. In some embodiments, generating a certificate 212 further comprises applying service role data 215 to the configuration data file 209. In some embodiments, the protected configuration data file 203 further comprises data pertaining to the certificate 212 applied to generate the protected configuration data file 203 and data pertaining to a thumbprint of the certificate 212. In some embodiments, the generated certificate 212 used to generate a protected configuration data file 203 is further associated with a private key 303.

The illustrated process concludes at 521, where a secure entry for a secure output file log 403 is generated based at least in part upon the service role performing the query. In some embodiments, the secure entry for the secure output file log 403 is further generated based upon the certificate 212. In some embodiments, generating an entry comprises, for example, an entry for an output file log based at least in part upon the service role performing the query and the private key 303. In some embodiments, the method further comprises generating a private key 303 associated with the certificate 212, and deploying the private key 303 for querying by the service role for accessing the plurality of data sets. In some embodiments, the service role deploying the protected configuration data file is distinct from the service role querying the protected configuration data file, such as, in one non-limiting example, as shown in FIG. 1, where the service role terminal 121 deploying the protected configuration data file 203 is distinct from the query terminal 127 querying the storage account 106 containing the configuration information 206.

Restricting the number of users that have access to resources such as stored data and applications enhances the security of the resources managed by the cloud-based computer system, in part by providing various levels of security over the configuration information 206 contained in a configuration data file 209. More specifically, access to the certificate 212 is provided to a user authorized to manage the deployment of configuration information read by a cloud-based application. However, access to the certificate does not necessarily provide access to the configuration information 206 because decoding the configuration information 206, in an embodiment, requires the use of the private key 303.

In some embodiments, the user must have additional knowledge of exactly what configuration information 206 to use that is contained in the configuration data file 209, providing an additional layer of security. And, in some embodiments, the user must have access to the environment itself, including the capability of accessing the physical hard disks directly, or the capability of logging into the network communicatively connected to the physical hard disks, in order to access the configuration information 206. In the manner described above, the three layers of protection provide improved security over the configuration data file 209, because all three layers are required for access to the configuration information 206. Without access to all of the various levels of protection, a user is not authorized to access the configuration information 206. By requiring various levels of protection over configuration information 206 as described above, security over the information is increased.

Figure 6:
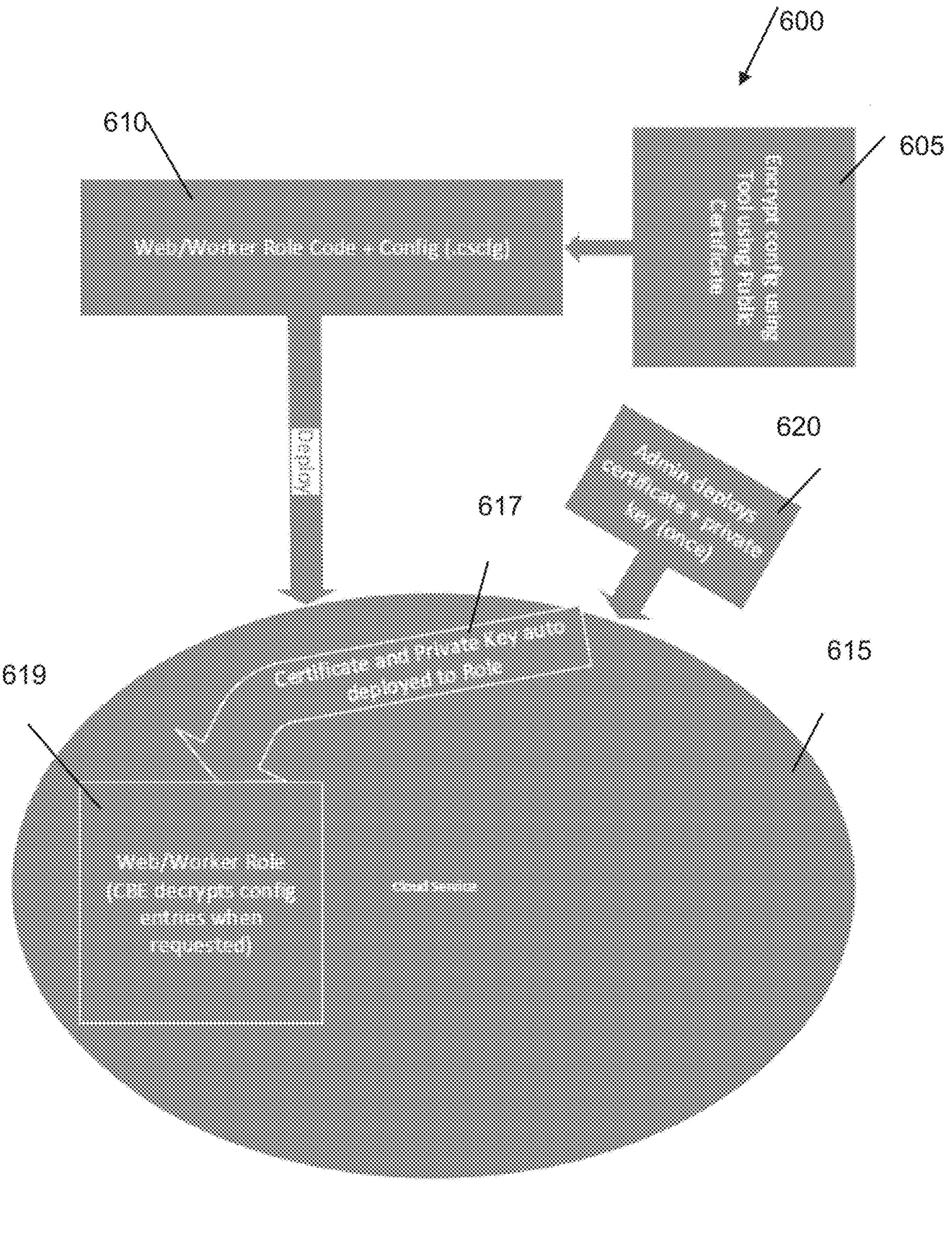
FIG. 6 illustrates a workflow diagram outlining a security enhancement method in accordance with some embodiments of the invention.

In reference to FIG. 6 illustrates a workflow diagram 600 outlining a security enhancement method in accordance with some further embodiments of the invention, some embodiments include methods to protect leakage of sensitive information such as storage keys and user passwords from service configuration settings by using CBE. For example, in some embodiments, only services which have the access to the certificate will be able to decrypt the configuration and use it (shown as process 619).

Referring to process 610, at least some worker and web roles require access to one or more Azure® storage accounts to store or access data or both. They might also need access to other sensitive information like user IDs and passwords to access other resources. To access a storage account, the name of the storage account and the access key is required. The name and access key are stored in the service definition file (.cscfg, see in definition above). As described earlier, a non-limiting example service definition file is shown below in Table 1 along with the account name and access key portion of .cscfg file.

In some embodiments, when the web or worker roles in process 610 queries the configuration for the storage account details, the details are output into log files by the Azure® SDK. An example is shown in Table 2, described earlier:

In some embodiments, sensitive configurations can be secured using CBE. Referring to process 620, in some embodiments, the certificate and associated private key can be loaded into the cloud using a controlled and audited mechanism. The encrypted configuration values and the thumbprint of the certificate is specified in the service configuration, with Table 3 illustrating a non-limiting embodiment as discussed earlier.

Referring to process 605 of FIG. 6, in some embodiments, the values are encrypted using a tool that only needs a public certificate (and not the private key). Therefore, in this instance, an operations department can manage deployments without need for the private key (which is tightly controlled).

In some embodiments, a cloud service role, when deployed to a cloud service 615 (shown as step 617), can include access to the private key and can retrieve and decrypt configuration entries, that are still logged, but in encrypted form. In this instance, if the configuration entries are leaked, they can't be decrypted without having access to the certificate's private key. An example log entry with encrypted values is shown in Table 4.

Figure 7:
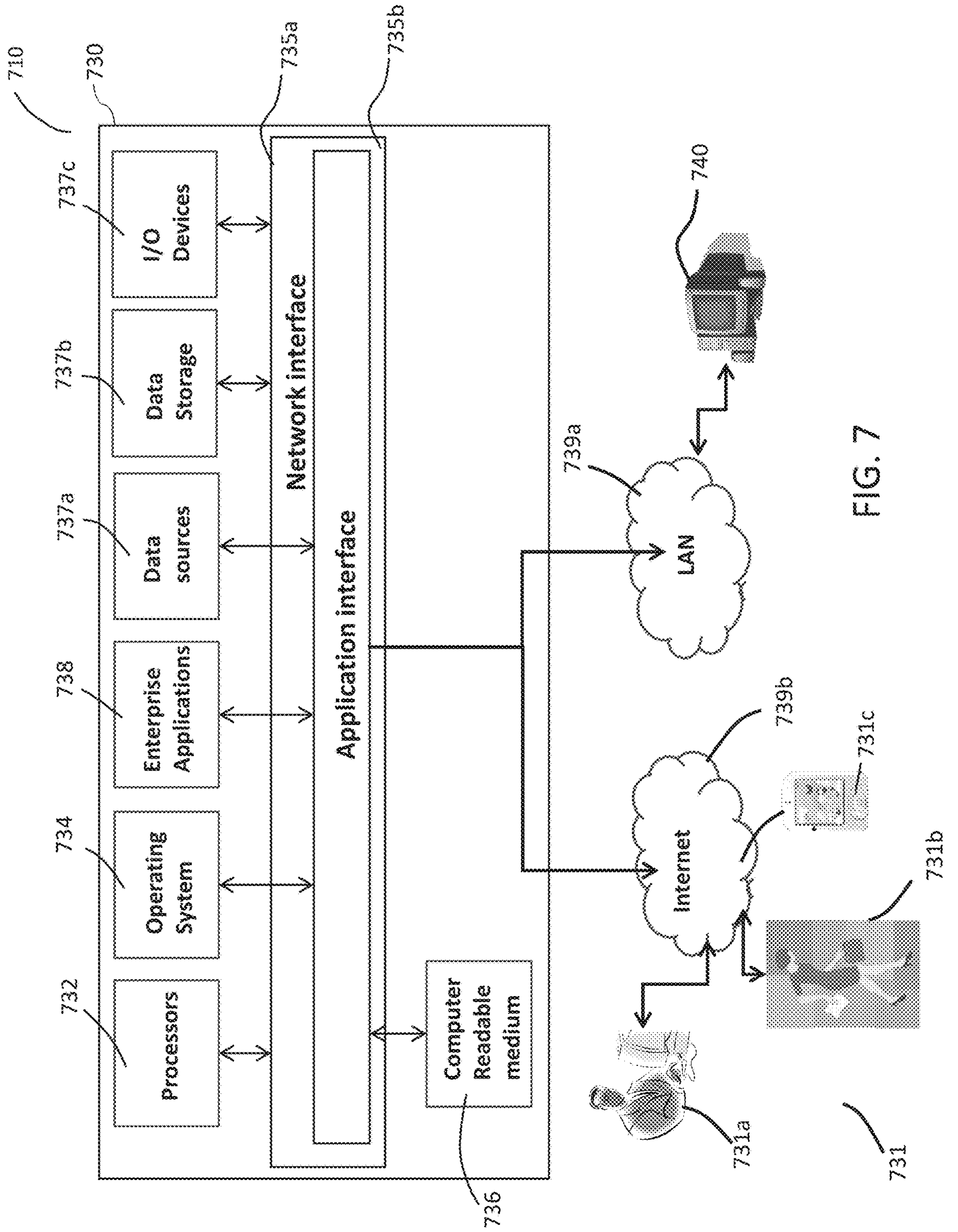
FIG. 7 illustrates a server system enabling or operating the methods of FIGS. 1-6 in accordance with some embodiments of the invention.

FIG. 7 illustrates a server system enabling or operating the methods of FIGS. 1-6 in accordance with some embodiments of the invention.

For example, in some embodiments, the server system 710 can operate and/or process computer-executable code of one or more software modules of the aforementioned system 100. Further, in some embodiments, the server system 710 can operate and/or display information within one or more graphical user interfaces.

In some embodiments, the system 710 can comprise at least one computing device 730 including at least one processor 732. In some embodiments, the at least one processor 732 can include a processor residing in, or coupled to, one or more server platforms. In some embodiments, the system 710 can include a network interface 735*a* and an application interface 735*b* coupled to the least one processor 732 capable of processing at least one operating system 734. Further, in some embodiments, the interfaces 735*a*, 735*b* coupled to at least one processor 732 can be configured to process one or more of the software modules 738 (e.g., such as enterprise applications). In some embodiments, the software modules 738 can include server-based software, and can operate to host at least one user account and/or at least one client account, and operating to transfer data between one or more of these accounts using the at least one processor 732.

With the above embodiments in mind, it should be understood that the invention can employ various computer-implemented operations involving data stored in server systems. Moreover, the above-described databases and models described throughout can store analytical models and other data on computer-readable storage media within the system 710 and on computer-readable storage media coupled to the system 710. In addition, the above-described applications of the system can be stored on computer-readable storage media within the system 710 and on computer-readable storage media coupled to the system 710. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 710 can comprise at least one computer readable medium 736 coupled to at least one data source 737*a*, and/or at least one data storage device 737*b*, and/or at least one input/output device 737*c*. In some embodiments, the invention can be embodied as computer readable code on a computer readable medium 736. In some embodiments, the computer readable medium 736 can be any data storage device that can store data, which can thereafter be read by a server system (such as the system 710). In some embodiments, the computer readable medium 736 can be any physical or material medium that can be used to tangibly store the desired information or data or instructions and which can be accessed by a computer or processor 732. In some embodiments, the computer readable medium 736 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 736 can transmit or carry instructions to a computer 740 and/or at least one user 731, including a router, private or public network, or other transmission device or channel, both wired and wireless. In some embodiments, the software modules 738 can be configured to send and receive data from a database (e.g., from a computer readable medium 736 including data sources 737*a* and data storage 737*b* that can comprise a database), and data can be received by the software modules 738 from at least one other source. In some embodiments, at least one of the software modules 738 can be configured within the system to output data to at least one user 731 via at least one graphical user interface rendered on at least one digital display.

In some embodiments of the invention, the computer readable medium 736 can be distributed over a conventional computer network via the network interface 735*a* where the system embodied by the computer readable code can be stored and executed in a distributed fashion. For example, in some embodiments, one or more components of the system 710 can be coupled to send and/or receive data through a local area network ("LAN") 739*a* and/or an internet coupled network 739*b* (e.g., such as a wireless internet). In some further embodiments, the networks 739*a*, 739*b* can include wide area networks ("WAN"), direct connections (e.g., through a universal serial bus port), or other forms of computer-readable media 736, or any combination thereof.

In some embodiments, components of the networks 739*a*, 739*b* can include any number of user devices such as personal computers including for example desktop computers, and/or laptop computers, or any fixed, generally non-mobile internet appliances coupled through the LAN 739*a*. For example, some embodiments include personal computers 740 coupled through the LAN 739*a* that can be configured for any type of user including an administrator. Other embodiments can include personal computers coupled through network 739*b*. In some further embodiments, one or more components of the system 710 can be coupled to send or receive data through an internet network (e.g., such as network 739*b*). For example, some embodiments include at least one user 731 coupled wirelessly and accessing one or more software modules of the system 710 including at least one enterprise application 738 via an input and output ("I/O") device 737*c*. In some other embodiments, the system 710 can enable at least one user 731 to be coupled to access applications 738 via an I/O device 737*c* through LAN 739*a*. In some embodiments, the user 731 can comprise a user 731*a* coupled to the system 710 using a desktop computer, and/or laptop computers, or any fixed, generally non-mobile internet appliances coupled through the internet 739*b*. In some further embodiments, the user 731 can comprise a mobile user 731*b* coupled to the system 710. In some embodiments, the user 731*b* can use any mobile computing device 731*c* to wireless coupled to the system 710, including, but not limited to, personal digital assistants, and/or cellular phones, mobile phones, or smart phones, and/or pagers, and/or digital tablets, and/or fixed or mobile internet appliances.

In some embodiments of the invention, the system 710 can enable one or more users 731 coupled to receive, analyze, input, modify, create and send data to and from the system 710, including to and from one or more enterprise applications 738 running on the system 710. In some embodiments, at least one software application 738 running on one or more processors 732 can be configured to be coupled for communication over networks 739*a*, 739*b* through the internet 739*b*. In some embodiments, one or more wired or wirelessly coupled components of the network 739*a*, 739*b* can include one or more resources for data storage. For example, in some embodiments, this can include any other form of computer readable media in addition to the computer readable media 736 for storing information, and can include any form of computer readable media for communicating information from one electronic device to another electronic device.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, an integrated device combining various features, such as features of the forgoing devices, or the like.

A client device may vary in terms of capabilities or features. Claimed subject matter is intended to cover a wide range of potential variations. A web-enabled fixed or mobile device may include a browser application that is configured to receive and to send web pages, web-based messages, and the like. The browser application may be configured to receive and display graphics, text, multimedia, and the like, employing virtually any conventional web-based language.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the figures and associated disclosure.

The invention claimed is:

1. A server system for securely providing configuration information to a cloud service comprising:

one or more computers comprising one or more processors and one or more tangible computer readable media, the one or more tangible computer readable media comprising instructions stored thereon that when executed cause the one or more computers to:

receive, by the one or more processors, configuration information, store, by the one or more processors, the received configuration information in a configuration data file, generate, by the one or more processors, a certificate, apply, by the one or more processors, the certificate to the configuration data file to transform the configuration data file into a protected configuration data file, and deploy, by the one or more processors, the protected configuration data file for querying by a service role of a cloud service;

wherein the cloud service is configured to read configuration settings from the configuration data file.

2. The server system of claim 1, wherein the configuration information comprises a name of a storage account.

3. The server system of claim 1, wherein the configuration information comprises an access key related to a storage account.

4. The server system of claim 1, wherein the configuration data file further comprises configuration settings for the cloud service.

5. The server system of claim 1, wherein the configuration data file further comprises configuration settings for individual roles.

6. The server system of claim 5, wherein the configuration data file further comprises configuration settings for role instances for the individual roles.

7. The server system of claim 1, wherein the protected configuration data file further comprises data pertaining to the certificate applied to generate the protected configuration data file.

8. The server system of claim 1, wherein the protected configuration data file further comprises data pertaining to a thumbprint of the certificate.

9. The server system of claim 1, wherein generating the certificate further comprises applying data related to the service role to the configuration data file.

10. The server system of claim 1, the one or more tangible computer readable media comprising further instructions stored thereon that when executed cause the one or more computers to:

generate, by the one or more processors, a private key associated with the certificate.

11. A server system for securely providing configuration information to a cloud service comprising:

a process historian, a data communications network, and one or more computers comprising one or more processors and one or more tangible computer readable media coupled to the process historian via the data communications network, the one or more tangible computer readable media comprising instructions stored thereon that when executed cause the one or more computers to:

receive, by the one or more processors, configuration information related to the process historian, store, by the one or more processors, the received configuration information in a configuration data file in a relational database, generate, by the one or more processors, a certificate, apply, by the one or more processors, the certificate to the configuration data file to transform the configuration data file into a protected configuration data file, apply, by the one or more processors, service role data to the configuration data file along with the certificate, generate, by the one or more processors, a private key associated with the certificate, and output, by the one or more processors, an output file log based at least in part upon a service role performing a query;

wherein the server system is configured to prevent access to the output file log without access to the private key.

12. The server system of claim 11, wherein the process historian is configured to provide reporting, analysis, and visualization.

13. The server system of claim 12, wherein the process historian comprises a time series database and the relational database.

14. The server system of claim 13, wherein the time series database is configured to store time series data;

wherein the relational database is configured to provide configuration settings.

15. The server system of claim 11, wherein the server system is configured to enable users that are not authorized to access the private key to deploy service roles.

16. The server system of claim 11, wherein the configuration information comprises a name of a storage account.

17. The server system of claim 11, wherein the configuration information comprises an access key related to a storage account.

18. The server system of claim 11, wherein the configuration data file further comprises configuration settings for individual roles.

19. The server system of claim 18, wherein the configuration data file further comprises configuration settings for role instances for the individual roles.

20. The server system of claim 11, wherein the protected configuration data file further comprises data pertaining to the certificate applied to generate the protected configuration data file.

* * * * *